United States Patent [19]
Casey, III et al.

[11] Patent Number: 5,371,782
[45] Date of Patent: Dec. 6, 1994

[54] METHOD AND APPARATUS FOR SELECTING A PREFERRED SERVICE PROVIDER DURING A CALL SETUP IN A PUBLIC CORDLESS TELEPHONE SYSTEM

[75] Inventors: William J. Casey, III, Clinton; George P. Cotsonas; Dale E. Lynn, both of Freehold; Edwin A. Muth, Red Bank, all of N.J.

[73] Assignee: AT&T Corp., Murray Hill, N.J.

[21] Appl. No.: 694,610

[22] Filed: May 2, 1991

[51] Int. Cl.$^5$ .................................. H04M 11/00
[52] U.S. Cl. .............................. 379/61; 379/62; 379/58
[58] Field of Search ..................... 379/58, 61, 62; 455/54.1, 54.2, 56.1

[56] References Cited

U.S. PATENT DOCUMENTS

| | | | |
|---|---|---|---|
| 4,646,345 | 2/1987 | Zdunek et al. | 379/62 |
| 4,843,385 | 6/1989 | Borras | 379/62 |
| 4,853,951 | 8/1989 | Bauer | 379/62 |
| 4,879,740 | 11/1989 | Nagashima et al. | 379/61 |
| 4,905,272 | 2/1990 | Van de Mortel et al. | 379/62 |
| 4,953,198 | 8/1990 | Daly | 379/61 |

FOREIGN PATENT DOCUMENTS

| | | | |
|---|---|---|---|
| 3441724 | 5/1986 | Germany | 379/62 |
| 0060032 | 3/1989 | Japan | 379/62 |
| 0309827 | 12/1990 | Japan | 379/62 |

*Primary Examiner*—Curtis Kuntz
*Assistant Examiner*—G. J. Oehling
*Attorney, Agent, or Firm*—Samuel R. Williamson

[57] ABSTRACT

In a public cordless telephone system, a cordless telephone handset unit requests and establishes a communications link with a public base unit served by a desired local service provider whenever possible. By generating a service request containing a specific carrier request code, the handset unit selectively identifies an available public base unit served by the desired local service provider and then establishes a communications link with this base unit. In response to receiving the service request from the handset unit, all public base units operated by the chosen service provider respond by providing a first acknowledgment signal. All other public base units respond by providing a second acknowledgment signal. When both such signals are received, the handset unit responds only to the first acknowledgment signal and establishes a communications link with the first base unit providing this signal. When only the second acknowledgment signal is received, the handset unit responds by establishing a communications link with the first base unit providing this second acknowledgment signal. When communications is established with a base unit providing the second acknowledgment signal, an alerting signal is generated at the handset unit thereby informing the user that even though he or she is able to make a telephone call, the desired local service provider was not reached. Collision avoidance between public base units while supporting this operation may be provided by assigning a specific one of a plurality of times during which each public base unit may respond to the service request from the handset unit.

17 Claims, 3 Drawing Sheets

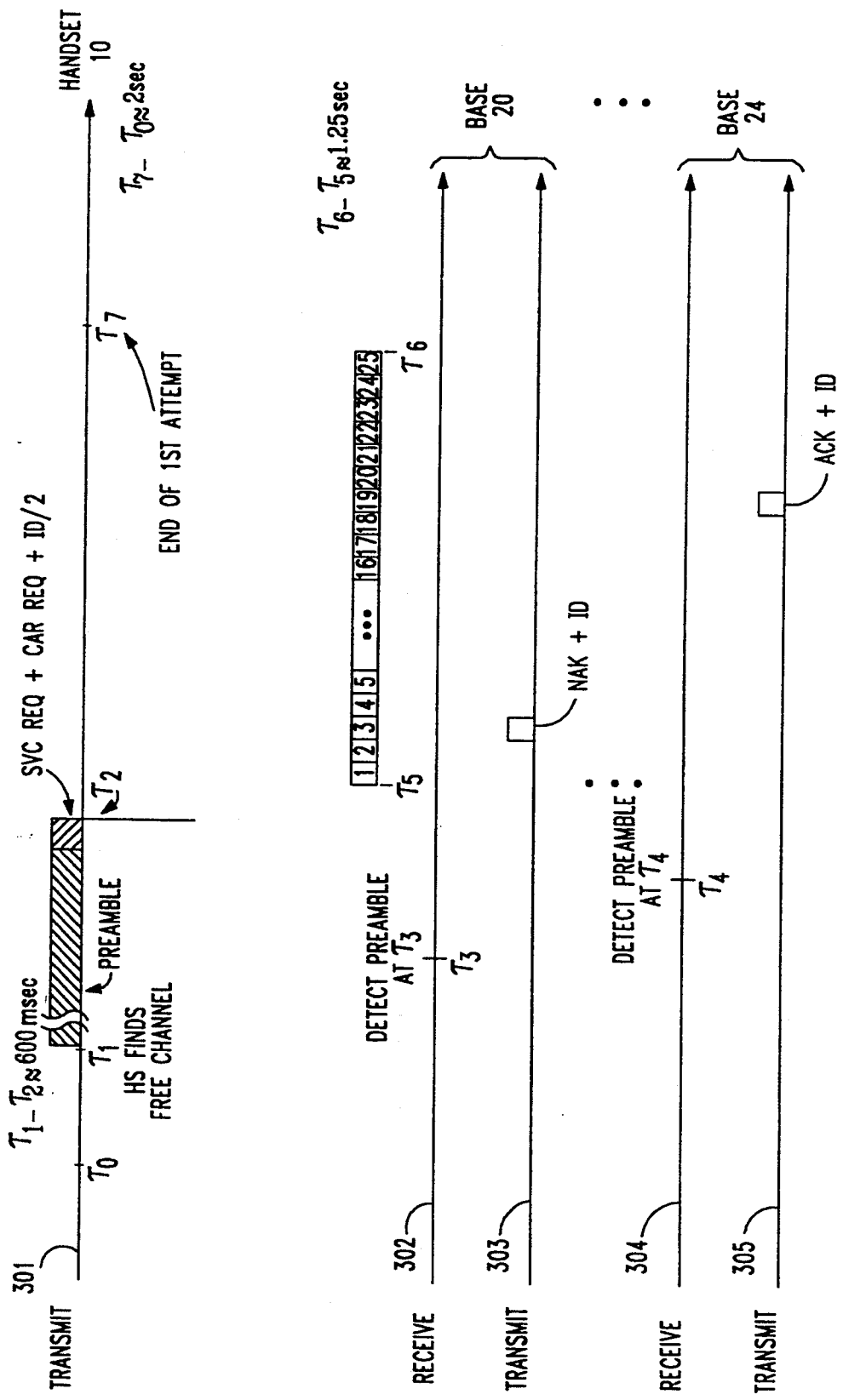

METHOD AND APPARATUS FOR SELECTING A PREFERRED SERVICE PROVIDER DURING A CALL SETUP IN A PUBLIC CORDLESS TELEPHONE SYSTEM

BACKGROUND OF THE INVENTION

1. Technical Field

This invention relates to cordless telephones and more particularly to cordless telephones arranged for deployment in a public telephone system.

2. Description of the Prior Art

Telephone communications in public areas have traditionally been limited to a person using a public telephone where he or she could make either charge calls, pay calls or credit card calls. The mobility of the user has thus been limited to the immediate surroundings of the public telephone, as determined by the length of the telephone handset cord. Other alternatives, such as cellular telephone service and the new telepoint system, are expensive and therefore unattractive to many potential users.

One economical alternative to the public telephone is a public cordless telephone system. Such a system is described in U.S. Pat. No. 4,953,198 which issued to J. J. Daly et al. on Aug. 28, 1990. The public cordless telephone system includes a plurality of public base units that are accessible by a plurality of portable, or cordless, telephone handset units. Each one of these handset units is capable of establishing communications with each one of the base units over a plurality of predetermined channels. Communication over each one of these channels as by way of a radio frequency carrier signal that is modulated by control signals and audio signals to and from a public base unit as appropriate. And the public base units are connected to telephone lines for providing convention telephone communications for the handset units.

In the operation of the public cordless telephone system, a communications link between the handset unit and the public base unit is established by a user activating the handset unit which, in turn, interrogates each one of a plurality of predetermined channels in order to establish communications with a public base unit on a nonbusy, or available, one of those channels. Once the handset unit selects an available channel, it transmits a service request which includes an identification code over this channel. A public base unit within the reception range of the handset unit receives the handset unit's identification code, appends its own identification code to this received code and then transmits the combined handset unit identification code and public base unit identification code back to the handset unit. The handset unit receives this combined code from the public base unit and then compares the handset portion of the received code with the code that it previously transmitted. If a favorable comparison of this code and the handset portion of the code received from the public base unit is obtained, the communications link is then established between the handset unit and the public base unit on that selected channel.

As public base units increase in number, many service providers are expected to provide carrier service for public base units. Thus if a handset unit happens to be within the reception range of two or more public base units that are capable or responding to the handset unit on the same channel, either one of these base units may respond to and establish communications with the handset unit. Since these public base units may not be provided by the same service provider, certain desirable communication options or features available from one service provider may not be available from the other.

SUMMARY OF THE INVENTION

In accordance with the invention, there is provided a mechanism for establishing a communications link with a public base unit served by a desired local service provider. The base unit stores a code identifying its particular service provider and this code is used as a basis for ensuring that a link is preferentially made with the desired service provider.

In particular, and in preferred embodiments, the handset unit generates a service request signal which includes a code identifying the service provider of choice. All public base units within the reception range of the handset unit responds to this service request signal. A public base unit operated by the chosen service provider responds by providing a positive service acknowledgment signal. All other public base units respond by providing a negative service acknowledgment signal. When both such signals are received, the handset unit responds only to the positive service acknowledgment signal and establishes a communications link with the base unit providing this signal. When only the negative service acknowledgment signal is received, the handset unit responds to this signal and establishes a communications link with the base unit providing this signal.

In accordance with a feature of the invention, when communications is established with a base unit providing a negative service acknowledgment signal, a distinctive alerting signal is generated at the handset unit thereby informing the user that even though he or she is able to make a telephone call, the service provider of choice was not reached.

BRIEF DESCRIPTION OF THE DRAWING

The invention and its mode of operation will be more clearly understood from the following detailed description when read with the appended drawing in which:

FIG. 3 is a timing diagram for illustrating the operation of public base units in responding to a service request signal from a handset unit for a particular local service provider, in accordance with the invention.

Throughout the drawing, the same element when shown in more than one figure is designated by the same reference numeral.

DETAILED DESCRIPTION

Figure 1:
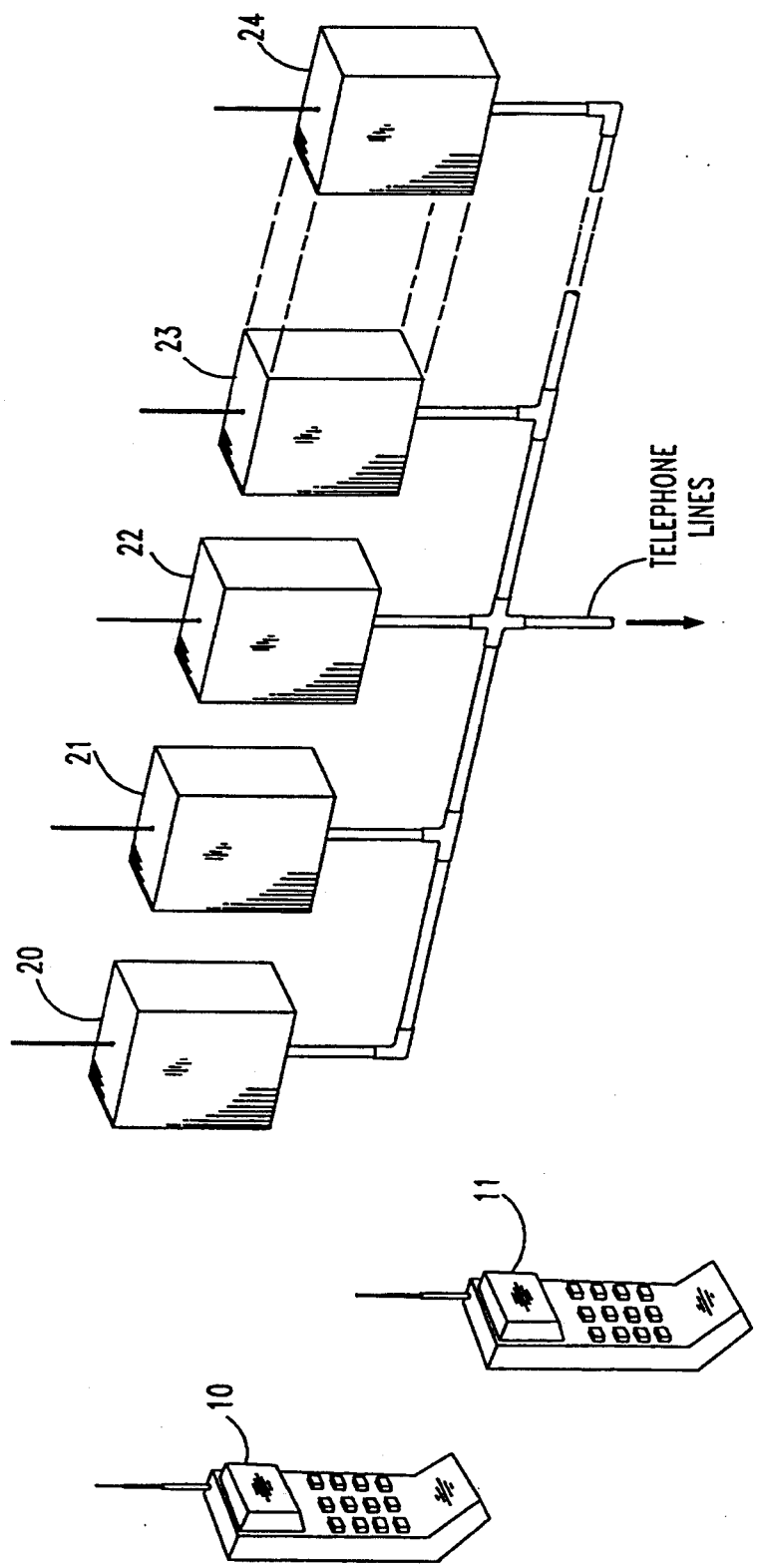
FIG. 1 depicts multiple handset units and multiple base units operative in accordance with the invention.

Referring now to FIG. 1 of the drawing, there are shown identical multiple cordless telephone handset units 10 and 11 and also identical multiple public base units 20 through 24. Each public base unit has its own assigned telephone tip-ring line and is capable of transmitting to and receiving from the handset units over each one of a plurality of predetermined channels. In the United States, ten frequency channels in the 46 through 49 MHz band are available to date for use by cordless telephones. Each channel has two frequencies, one on which the base unit transmits and the handset unit receives and the other on which the handset unit transmits and the base unit receives.

Communication attempts between a handset unit and public base units are initiated by a user activating the handset unit which, in turn, interrogates each one of the plurality of predetermined channels in order to establish communications with a base unit on one of those channels. When the handset unit is activated, it initializes a receiver and transmitter contained therein on a selected first one of the predetermined channels for respective reception and transmission thereon. If a public base unit is then engaged with and communicating with another handset unit on this selected first channel, this busy status of the public base unit is detected and no transmission by the handset unit of the user attempting to establish communications is made on this channel. Rather, the handset unit advances to the next channel, determines if that channel is available, or free, and continues on in this manner until an available channel is located.

If no carrier signal is detected on the selected first one of the predetermined channels, the handset unit generates a service request signal on this channel. If there is no answer within a predetermined time period, which could result if the handset unit is outside of the reception range of all of the public base units, the handset unit automatically advances to the next available channel. The handset unit then signals on this channel. If no answer is provided to the handset unit on this channel by a public base unit after this second attempt, the handset unit provides an out-of-range indication to the user of the handset unit.

Figure 2:
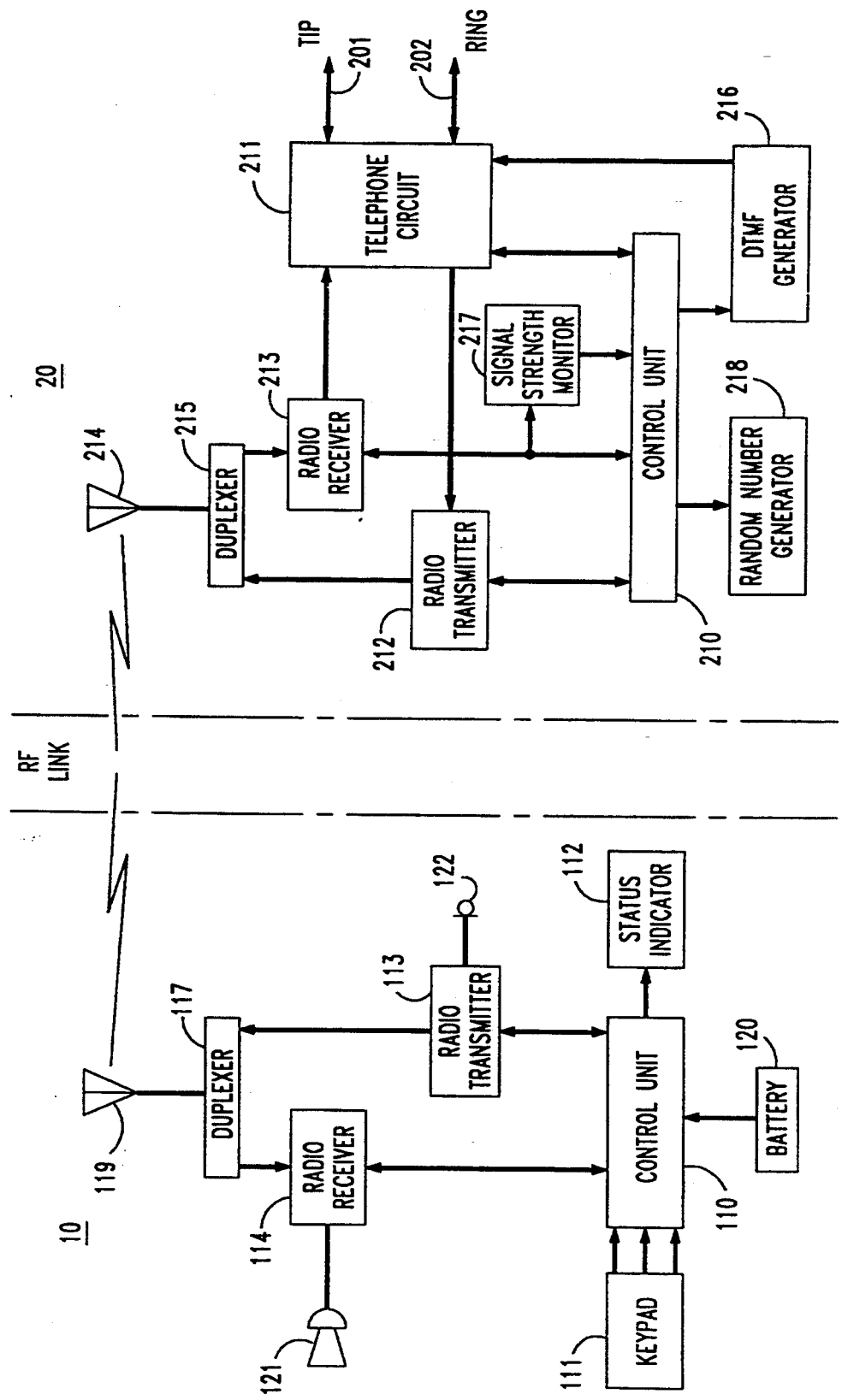
FIG. 2 is a block representation of the major functional components of one of the handset units and one of the public base units depicted in FIG. 1, operative in accordance with the invention.

Referring next to FIG. 2, there is shown a functional block representation of a public cordless telephone system operative in accordance with the principles of the invention. As shown, the public cordless telephone system generally comprises at least one handset unit 10 and at least one public base unit 20. With regard to the functional components illustratively described for handset unit 10, the handset unit 11, shown in FIG. 1, incorporates the same components as this handset unit and is operationally identical. Similarly, the public base units 21 through 24 of FIG. 1 incorporate the same components as the public base unit 20 and also are operationally identical.

Included in the handset unit 10 is a control unit 110 which advantageously provides a number of control functions. This control unit 110 may be implemented through the use of a microcomputer containing read-only-memory (ROM), random-access-memory (RAM) and the proper coding of this microcomputer. Such a microcomputer is known in the art and is readily available from semiconductor manufacturers such as Fujitsu, Motorola and NEC.

The control unit 110 generates an 8-bit identification code that is transmitted from the handset unit 10 to the public base unit 20 while establishing initial communications. This control unit 110 also configures a radio frequency (RD transmitter 113 and a RF receiver 114 for operation on each of the plurality of predetermined channels for communicating with a selected one of the plurality of public base units operating on the selected predetermined channel. The transmitter 113 and the receiver 114 respectively transmits signals to and receives signals from the public base unit 20, with the control unit 110 providing channel control information to both units. The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the public base unit 20 and couples these signals to a loudspeaker 121. The transmitter 113 has as its input speech signals from a microphone 122 which it transmits to the public base unit 20.

In operation, the receiver 114 is initially configured for sequentially interrogating and detecting an available channel for communicating with one of the plurality of public base units, such as base unit 20. When an available channel is detected, the channel information is provided to the control unit 110 from the receiver 114. The control unit 110 processes the appropriate channel selection and identification code data selected for use in the handset unit 10 and generates a service request signal which is transmitted by transmitter 113 over the available channel. This service request signal is a frequency shift keying (FSK) signal and includes a preamble and a synchronizing signal immediately followed by a request-for-service message which comprises a data field. Included in this data field are an 8-bit service request code, the 8-bit identification code generated by the control unit 110, and, in accordance with the invention, a 12-bit carrier request code to be described in greater detail later herein.

A battery 120 is included in the handset unit 10 and provides operating power for all circuitry in this unit. Also included in the handset unit is a keypad 111 and a handset unit status indicator 112. The keypad 111 is used for entering the three digits corresponding to the 12-bit carrier request code and also dial digits or control functions executed by the control unit 110 in the handset unit. The handset unit status indicator 112 contains, for example, an acoustic alerter and light emitting diodes (LEDs) suitably arranged for providing the desired status indications. This status indicator 112 is connected to the control unit 110 and provides an indication to the user of the handset unit when (1) a communications link has been established between the handset unit 10 and a public base unit from a service provider of choice, (2) a communications link has been established between the handset unit 10 and a public base unit not connected to the service provider of choice, (3) a communications link can not be established due to all base units being busy, or (4) a communications link can not be established due to the handset unit being outside of the reception range of a public base unit. A battery status indication reflective of the charge on the battery 120 is also provided by this status indicator 112.

Contained in the public base unit 20 is a control unit 210 which interfaces with control unit 110 in the handset unit 10 for receiving the appropriate identification code data and for establishing a two-way communications link between a handset unit and the public base unit 20. Also contained in the public base unit 20 are a transmitter 212 and receiver 213 for communicating with the selected handset unit. The output of the transmitter 212 and input for the receiver 213 are commonly coupled to an antenna 214 through a duplexer 215.

The control unit 210 receives and processes opcode data provided by the handset unit 10 in dialing and providing tone signaling information out to a central office via telephone circuit 211 and tip-ring lines 201 and 202. The telephone circuit 211 serves as a "plain old telephone service" (POTS) interface for signals on the tip-ring lines and those respectively received by receiver 213 and transmitted by transmitter 212. Responsive to the control unit 210, a dual-tone-multiple-frequency (DTMF) generator 216 provides the signaling tones to the telephone circuit 211 for transmission over the tip-ring lines 201 and 202. The tip-ring lines 201 and 202 are preferably connected to a "charge-a-call" line which is provided with call screening, call blocking, call rating, and fraud protection through the telephone company's traffic service position system (TSPS) facilities for noncommercial credit card calls and through the telephone company's call processor for commercial credit card calls. The tip-ring lines 201 and 202 may also be connected to the telephone company central office via a measured business service line, typically referred to as a "1MB" line. In this arrangement, call screening, call blocking, call rating, and fraud protection am provided through the public base unit. A method for providing this type of protection for a telephone connected to a 1MB line is disclosed in U.S. Pat. No. 4,782,516 issued to R. L. Maybach on Nov. 1, 1988.

The control unit 210 also receives and processes the service request signal containing both the carrier request code and the identification code from the handset unit 10. The carrier request code is examined and found to either match or not match a code associated with a service provider who provides the base unit and the telephone line (carrier) for connecting the base unit to a central office. This determination is made by comparing the received 12-bit carder request code with the unique 12-bit carrier code that may be stored in, for example, ROM or presettable switches in the public base unit 20. This comparison operation is advantageously performed in a public base unit since each public base unit receiving the service request signal is able to simultaneously perform the comparison operation and thereby quickly generate an appropriate response message. It will become apparent to those skilled in the art, however, that the comparison operation may alternatively be implemented in control unit 110 in the handset unit 10 without departing from the spirit and scope of our invention, and such operation is hereby considered to be in accordance with this invention.

In response to the comparison operation and in accordance with the invention, the public base unit 20 either generates a positive service acknowledgment signal or a negative service acknowledgment signal for transmission back to the handset unit 10. Included in the positive service acknowledge signal is a positive service acknowledgment message comprising an 8-bit positive carrier response code and a 16-bit :identification code. This 16-bit identification code is a combination of the 8-bit identification code from the handset unit and an appended 8-bit identification code that is unique to this particular public base unit. This combined code thus uniquely identifies (a) the handset unit transmitting the original code, and thereby requesting service, as well as (b) the public base unit responding to the request for service.

The negative service acknowledge signal includes a negative service acknowledgment message comprising an 8-bit negative carrier response code and a 16-bit identification code. A common negative carrier response code is generated by all base units not having the carrier code sought by the handset unit. As in the positive service acknowledgment signal, the 16-bit identification code in the negative service acknowledgment signal also is a combination of the 8-bit identification code from the handset unit and an appended 8-bit identification code that is unique to the particular public base unit.

Once the control unit 210 performs the comparison operation and generates the appropriate acknowledgment message, it transmits this message in an acknowledgment signal back to the control unit 110 in handset unit 10. The handset unit receives this acknowledgement signal and determines whether it is a positive service acknowledgment signal or a negative service acknowledgment signal from the public base unit. If it is a positive service acknowledgment signal, communications is established between the handset unit and the public base unit on the selected channel. If the response is a negative service acknowledgment signal, communications is also established between the handset unit and the public base unit on the selected channel. In the latter instance, however, the status indicator 112 provides an indication to the user of the handset unit that communications between the handset unit and a base unit have been established, but not to a base unit being operated by the service provider of choice. Upon receipt of this indication, the user of the handset then has the option of continuing or terminating the telephone call at that time.

Once communications with any public base unit is established by a handset unit, other cordless handset units are precluded from interfering with or establishing communications on the channel with the engaged public base unit. Even if a handset unit erroneously determines that an occupied channel is idle and transmits a service request signal, the base unit will ignore this service request signal because the identification code of the handset unit attempting to interrupt is different from the identification code that is then being used for all message signals between the public base unit and the earlier linked handset unit over the selected channel.

The public base unit 20 detects radio link quality through use of a signal strength monitor circuit 217. This circuit is capable of differentiating between a range of receive signal levels and may be, for example, a received signal strength indicator (RSSI) circuit. An RSSI circuit produces an output voltage that is proportional to the strength of the received signal from the handset unit. Through use of an analog-to-digital converter associated with the signal strength monitor circuit 217, a corresponding digital signal output representative of the strength of the receive signal is selected from within the range of receive signal levels and provided to the control unit 210.

In a first application of this digital signal, the control unit 210 compares this voltage relative to a predetermined lower threshold level. If during the setting up of the call, the control unit determines that the communications link would be poor because of the received signal quality, the control unit does not allow the public base unit to respond to a handset unit requesting service. Also during operation, if the communications link between the handset unit and the public base unit degrades to a quality less than the predetermined lower threshold level, the control unit 210 causes the public base unit to generate an audible and distinctive tone which is recognizable to the user that he or she is then approaching the outer limit of the operating range for that handset unit in the public cordless telephone system.

If a handset unit happens to be within the reception range of two or more public base units that are capable or responding to the handset unit on the same channel, collision between these base units in responding to the handset unit may result. Thus if more than one public base responds to a handset unit at the same time, each acknowledgment signal received by the handset unit is very likely to be rendered unintelligible by the other one or more received acknowledgment signals and the handset unit is forced to ignore all the acknowledgment signals and go through the process of generating another service request signal either on that channel or on another channel, hopefully with more favorable results the second time.

In order to prevent this collision and in a second application of the digital signal reflective of a receive signal level, the control unit 210 employs the digital signal to assist in resolving the contention between multiple public base units attempting to respond to a service request signal generated by a handset unit. In this application, the time for response for the public base unit is determined by the received strength of the signal from the handset unit. Thus when two or more public base units receive the same service request signal from a handset unit, a public base unit having the greater received signal strength from the handset unit would also have the earlier occurring response time for responding to the handset unit. Such an implementation of the operation of a base unit, in a public cordless telephone system is described in copending application, Ser. No. 07/704516 commonly assigned with this application to the same assignee.

Contention between base units may also be resolved through use of a random number generator such as generator 218 included in the public base unit In operation, the base unit generates a random number and assigns a time at which the base unit may respond to the handset unit as a function of the generated random number. Thus when two or more public base units receive the same service request signal from a handset unit, a first public base unit having a random number of a smaller magnitude than the random number of a second public base unit would also have assigned thereto an earlier occurring response time for responding to the handset unit. This implementation for the operation of a base unit in a public cordless telephone system also is described in copending application, Ser. No. 07/704516.

Contention between base units may also be resolved through use of an implementation which uses both the receive signal strength level from the handset unit and the generation of the random number. In this implementation, contention between base units is avoided by assigning the time during which a public base unit may respond to a handset requesting service (1) as a function of the received signal strength from the handset unit and (2) as determined by the generation of the random number. This operation provides a response time reflective of the received signal strength from the handset unit, the earlier occurring response time being provided to the base unit receiving the stronger signal.-And through generation of the random number, a random factor is also provided in this response time.

Referring next to FIG. 3 in combination with FIG. 2, there is shown in FIG. 3 a timing diagram for illustrating, in accordance with the invention, the operation of different ones of multiple public base units in responding to a service request signal for a particular local service provider that provides the carrier service. Illustratively depicted in this timing diagram are related time lines 301 through 305. Line 301 illustrates the timing sequences for, by way of example, handset unit 10 in attempting to establish communications with one of the multiple public base units that is served by the desired local service provider. Lines 302 and 303 respectively illustrate the receive and transmit sequences of, for example, a public base unit 20 in attempting to respond to a service request signal received from handset unit 10. This public base unit 20 is not served by the desired local service provider. And lines 304 and 305 respectively illustrate the receive and transmit sequences of, for example, a public base unit 24 in attempting to respond to the service request signal received from handset unit 10. This public base unit 24 is served by the desired local service provider. Although not specifically shown in the timing diagram, other public base units possibly served by other local service providers are expected to be within the reception range of the handset unit requesting service. Thus these other public base units also will attempt to respond to a service request signal from handset unit 10. Compatible operation for all the public base units within the cordless telephone system is advantageously achieved as they attempt to respond to a service request signal from handset unit 10.

For establishing communications between a handset unit and a public base unit served by the desired local service provider, a user within the coverage area of the public base units 20 and 24, shown in FIG. 1, requests service by pushing an activation button on the keypad 111 of handset unit 10. In response, the receiver 114 in handset unit 10 first listens for a carrier signal on a selected first one of the plurality of predetermined channels. If a carrier is detected on this channel at a level above a certain minimum threshold, this is an indication that this channel is already busy with a public base unit communicating with another handset unit. In this event, the handset unit advances to the next one of the predetermined channels, determines if that channel is available, or free, and continues on in this manner until an available channel is located. The handset unit takes approximately 30 milliseconds to interrogate all the predetermined channels. This time interval is illustrated on line 301 as time $\tau_0$ to time $\tau_1$. If after interrogating all of the channels, the handset unit does not find an available one, an all-channels-busy signal is provided to the user of the handset unit.

If the handset unit has selected an available channel at time $\tau_1$ or earlier, it then transmits a preamble over this selected channel. The preamble is approximately 545 milliseconds in length and comprises alternating 2.5 millisecond marks and spaces transmitted prior to a synchronization period and the data field. The synchronization period is 16.5 milliseconds in length and is immediately followed by a 36.75 millisecond data field which comprises the request-for-service message. This request-for-service message includes a service request code (SVC REQ), a 12-bit carrier request code (CAR REQ) and eight of the sixteen bits of the identification code (ID/2) used when communications between a handset unit and a public base unit have been established. The other eight bits of this identification code are provided by the public base unit which establishes communications with the handset unit.

The 12-bit carrier request code is a feature that is programmable into a handset unit by a user prior to the handset unit being placed into service, or it may be changed as desired by the user thereafter. A list of unique 12-bit codes of three digits each identifying local service providers is provided to the user of the handset unit who may then program into the handset unit the local service provider of choice. Should no local service provider be selected when the request-for-service message is transmitted by the handset unit, the 12-bit code will comprise all zeroes which reflects no service provider preference by the handset unit. Each public base unit receiving this request-for-service-message will interpret it as a match for its particular service provider and thereby generate a positive service acknowledgment signal for transmission to the handset unit. With this all zero code set in the handset unit, the first one of any public base units responding is permitted to gain access to the handset unit and provide a communications link therefor.

During the time that a public base unit is not involved in a call with a handset unit, it repeatedly scans all of the predetermined channels spending 20 milliseconds per channel looking for the preamble that is part of the transmission of a handset unit generating a service request signal The 545 millisecond preamble transmitted by the handset unit 10 provides sufficient time for a public base unit to scan each of the predetermined channels and arrive at the channel having the preamble sometime before the beginning of both the synchronizing signal and the request-for-service message. Line 302 shows public base unit 20 detecting the preamble at time $\tau_3$. If other nearby public base units are available and located within the reception range of the signal from handset unit 10, they will also be scanning over the predetermined channels and will detect the preamble sometime before the beginning of the synchronizing signal and the request-for-service message. Thus line 304 shows that public base unit 24 detects the preamble at time $\tau_4$. Upon detection of this preamble, each of these two public base units, as well as any others that similarly detect it, will stop scanning the predetermined channels and remain on the channel having the preamble in order to receive and respond to the request-for-service message.

After the public base unit 20 has received the request-for-service message at time $\tau_2$, the carrier request code is examined and found to not match the code associated with the service provider for which this public base unit provides service. This determination is made by comparing the received 12-bit carder request code with the unique 12-bit carrier code stored in the public base unit. This public base unit then generates a negative service acknowledgment signal for transmission back to the handset unit 10. Included in this negative service acknowledgment signal is a negative carrier response code (NAK) and the full 16-bit identification code (ID). The negative carrier response code is one that is provided whenever the received 12-bit carrier request code and the unique 12-bit carder code stored in the public base unit do not match.

The negative service acknowledgment signal provides an indication to the handset unit 10 that it has reached a public base unit not served by the desired local service provider. This public base unit also executes any one of the collision avoidance routines, earlier described herein, for resolving contention between itself and other base units possibly attempting to respond to the service request signal received from the handset unit 10. If by way of example, the routine employing a random number is executed by the public base unit, a random number will be generated by this public base unit for resolving contention between itself and other public base units responding to a service request signal from the handset unit 10. In the execution of this routine, the public base unit 20 may have, for example, 25 discrete time slots in which it may respond, illustratively shown as beginning at time $\tau_5$ and ending at time $\tau_6$.

If, as illustrated on line 303, a random number is generated which corresponds to time slot number three of the multiple contiguous time slots, then public base unit 20 will transmit the negative service acknowledgment signal which includes the negative carrier response code (NAK) and the identification code (ID) on the selected channel within a time corresponding to this time slot back to the handset unit 10. As earlier indicated herein, this identification code will be a combination of the 8-bit handset unit identification code along with an 8-bit appended identification code that is unique to this particular public base unit.

After the public base unit 24 has received the service request signal at time $\tau_4$, the carrier request code is examined and found to match the code associated with the service provider for which this public base unit provides service. This public base unit then generates a positive service acknowledgment signal for transmission back to the handset unit 10. This signal includes a positive carrier response code (ACK) and the full 16-bit identification code (ID). The positive carrier response code is a standard code that is transmitted to the hand set unit when the received 12-bit carrier request code matches the unique 12-bit carrier code stored in the public base unit.

The positive service acknowledgment message provides an indication to the handset unit 10 that it has reached a public base unit served by the desired local service provider. Like public base unit 20, this public base unit 24 may execute any one of the collision avoidance routines, described earlier herein, for resolving contention between itself and other public base units possibly attempting to respond to the service request signal received from the handset unit 10. Assuming for purposes of illustration that the collision avoidance routine involving the generating of a random number is executed by the public base unit 24, a random number is thus generated for this public base unit. As shown on the timing diagram, this random number corresponds to time slot number nineteen. Thus, in the time corresponding to this slot, public base unit 24 will transmit a positive service acknowledgment signal which includes its positive carrier response code and the full 16-bit identification code on the selected channel to the handset unit 10.

Contention between the public base units for access to the handset unit is resolved by this sequencing process. Appropriate coding in the handset unit allows the handset unit to operate in a manner such that the handset unit receives and stores in RAM during a time interval between time $\tau_2$ and time $\tau_7$ all positive service acknowledgment messages and negative service acknowledgment messages for processing that are accompanied by the handset unit's own identification code.

In the illustrative example of FIG. 3, the handset unit 10 awaits a response from a public base unit during the time interval between time $\tau_2$ and time $\tau_7$. In this interval, the first response received from a public base unit that is accompanied by the handset unit's own identification code is the negative service acknowledgment signal provided by public base unit 20. The handset unit receives this response and determines that it is not from a public base unit served by the desired local service provider. This response is stored in RAM by the handset unit which then continues listening on the selected frequency for a positive service acknowledgment signal indicating that the handset unit has reached a public base unit served by the desired local service provider. As shown in FIG. 3, the handset unit next receives the positive service acknowledgment signal from public base unit 24, which is served by the desired local service provider. The handset unit 10 then adopts the entire identification code from this public base unit 24 which is a combination of its own identification code and the identification code provided by this public base unit. This combined identification code thus becomes the unique identification code used for any subsequent op-code transfers between the handset unit and the public base unit during this particular call. All other public base units subsequently providing positive service acknowledgment and negative service acknowledgment messages to the handset unit 10 will be ignored by this handset unit after adoption of the code provided by base unit 24.

In the event that the handset unit does not receive a positive service acknowledgment signal from a public base unit served by the desired local service provider during the time interval between time $\tau_2$ and time $\tau_7$, the handset unit will process the first received response containing a negative service acknowledgment signal. Thus, as illustrated in the timing diagram, the handset unit will adopt the negative service acknowledgment signal received from public base unit 20 and establish a communications link with this public base unit. The negative service acknowledgment signal will cause a distinctive alerting signal to be generated at the handset unit, however, so that the user will know that he or she has not reached the desired service provider. Thus the user at this point has the option to terminate or go forward with the telephone call.

In the event that the handset unit does not receive an acceptable positive service acknowledgment signal nor an acceptable negative service acknowledgment signal by time $\tau_7$, then the handset unit will in effect start again at time $\tau_0$, advance to the next available channel and repeat the above described sequence once again. Repeating this sequence minimizes the possibility that the handset unit will not be able to establish communications with a public base unit as a result of collision between two or more public base units generating the same random number and then transmitting in the same time slot. Indeed, the chances of two or more public base units independently generating identical random numbers during both communications attempts by the handset unit is extremely remote. This advantageous operation is achieved since the time for each acknowledgment signal generated by each base unit is determined by a random number selected from 25 possible numbers. If two or more acknowledgment signals provided in a first sequence happen to be generated in the same time slot, the handset unit ignores these acknowledgment signals and a second execution of the sequence is provided. During the second sequence, it is unlikely that these public base units would again independently generate the same random number. If the handset unit has not received an acceptable acknowledgment signal by the time $\tau_7$ arrives a second time, then the handset unit issues an out-of-range signal to its user.

Various other modifications of this invention are contemplated and may obviously be resorted to by those skilled in the art without departing from the spirit and scope of the invention as hereinafter defined by the appended claims.

We claim:

1. A cordless telephone handset unit for operation in a public cordless telephone system, the telephone system including a plurality of base units connectable to a telephone line for communicating both with a central office and with the handset unit, the handset unit comprising:

means for generating a service request signal for establishing communications with one of the plurality of base units, the service request signal including a predetermined signal code for identifying a base unit having a signal code that compares favorably with this predetermined signal code;

means for detecting a first or second service request response signal received from each one of the plurality of base units within a predetermined time period;

means responsive to the detecting means for establishing communications with one of the plurality of base units, the establishing means setting up communications between the handset unit and the first one of the plurality of base units providing in the predetermined time period the first service request response signal and, in the absence of the handset unit receiving the first service request response signal in the predetermined time period, the establishing means setting up communications between the handset unit and the first one of the plurality of base units providing a second service request response signal within the predetermined time period.

2. The cordless telephone handset unit as in claim 1 wherein the first service request response signal transmitted to the handset unit is a positive service acknowledgment signal, and the second service request response signal transmitted to the handset unit is a negative service acknowledgment signal.

3. The cordless telephone base unit as in claim 1 wherein the predetermined signal code is associated with a specific service provider providing the base unit and telephone line for connecting the base unit to the central office.

4. A cordless telephone handset unit for operation in a public cordless telephone system, the telephone system including a plurality of base units connectable to a telephone line for communicating both with a central office and with the handset unit, the handset unit comprising:

means for generating a service request signal for establishing communications with one of the plurality of base units;

means for detecting a service request response signal received from each one of the plurality of base units within a predetermined time period, each service request response signal containing a unique signal code associated with the base unit providing the service request response signal;

means for comparing a predetermined signal code stored in the handset unit with the unique signal code received from each base unit responding to the service request signal; and means responsive to the comparing means for establishing communications with one of the plurality of base units, the establishing means setting up communications between the handset unit and the first one of the plurality of base units providing in the predetermined time period a unique signal code that compares favorably with the predetermined signal code stored in the handset unit and, in the absence of the handset unit receiving a favorably compared unique signal code in the predetermined time period, the establishing means setting up communications between the handset unit and the first one of the plurality of base units providing a non-favorably compared signal code within the predetermined time period.

5. The cordless telephone handset unit as in claim 4 further comprising means for generating a distinctive alerting signal in the handset unit in response to the handset unit establishing communications with one of the plurality of base units providing a non-favorably compared unique signal code within the predetermined time period.

6. A cordless telephone arrangement for operation in a public telephone system, the arrangement including a plurality of base units connectable to a telephone line for communicating with a central office and at least one cordless handset unit for establishing communications with the base units, the arrangement comprising:

means in the handset unit for generating a service request signal for establishing communications with one of the plurality of base units, the service request signal including a first predetermined signal code for initially identifying a base unit also containing this first predetermined signal code;

means in each base unit for comparing a second predetermined signal code stored therein with the first predetermined signal code received from the handset unit generating the service request signal;

signal response generating means in each base unit responsive to the comparing means, the signal response generating means causing a positive service acknowledgment signal to be transmitted to the handset unit when the first predetermined signal code received from the handset unit compares favorably with the second predetermined signal code stored in the base unit, and a negative service acknowledgment signal to be transmitted to the handset unit when the first predetermined signal code received from the handset unit compares unfavorably with the second predetermined signal code stored in the base unit; and signal receiving means in the handset unit for selectively responding to the positive service acknowledgment signal received from the plurality of base units and the negative service acknowledgment signal received from the plurality of base units, the signal receiving means storing all negative service acknowledgment signals received from the plurality of base units in a predetermined time period and, upon receiving a positive service acknowledgment signal in this predetermined time period from a base unit, establishing communications with the base unit providing the first positive service acknowledgment signal.

7. A cordless telephone arrangement for operation in a public telephone system, the arrangement including a plurality of base units connectable to a telephone line for communicating with a central office and at least one cordless handset unit for establishing communications with the base units, the arrangement comprising:

means in the handset unit for generating a service request signal for establishing communications with one of the plurality of base units, the service request signal including a first predetermined signal code for initially identifying a base unit also containing this first predetermined signal code;

means in each base unit for comparing a second predetermined signal code stored therein with the first predetermined signal code received from the handset unit generating the service request signal;

signal response generating means in each base unit responsive to the comparing means, the signal response generating means causing a positive service acknowledgment signal to be transmitted to the handset unit when the first predetermined signal code received from the handset unit compares favorably with the second predetermined signal code stored in the base unit, and a negative service acknowledgment signal to be transmitted to the handset unit when the first predetermined signal code received from the handset unit compares unfavorably with the second predetermined signal code stored in the base unit; and signal receiving means in the handset unit for selectively responding to the positive service acknowledgment signal received from the plurality of base units and the negative service acknowledgment signal received from the plurality of base units, the signal receiving means storing all negative service acknowledgment signals received from the plurality of base units in a predetermined time period and, in the absence of receiving a positive service acknowledgment signal from a base unit in this predetermined time period, establishing communications with the first base unit providing the negative service acknowledgment signal within the predetermined time period.

8. The cordless telephone base unit as in claim 6 wherein the predetermined signal code is associated with a specific service provider that connects the base unit to a central office.

9. The cordless telephone base unit as in claim 8 wherein the predetermined signal code is a 12-bit code.

10. A method of operating with a cordless telephone handset unit in a public cordless telephone system, the telephone system including a plurality of base units connectable to a telephone line for communicating both with a central office and with the handset unit, the method comprising the steps of:

generating a service request signal for establishing communications with one of the plurality of base units, the service request signal including a predetermined signal code for identifying a base unit initially having a signal code that compares favorably with this predetermined signal code;

detecting a first or second service request response signal received from each one of the plurality of base units within a predetermined time period;

comparing the predetermined signal code stored in the handset unit with the unique signal code received from each base unit responding to the service request signal; and establishing communications with one of the plurality of base units, the establishing step initiating communications between the handset unit and the first one of the plurality of base units providing in the predetermined time period the first service request response signal and, in the absence of the handset unit receiving the first service request response signal in the predetermined time period, the establishing step initiating communications between the handset unit and the first one of the plurality of base units providing the second service request response signal within the predetermined time period.

11. A method of operating with a cordless telephone handset unit in a public cordless telephone system, the telephone system including a plurality of base units connectable to a telephone line for communicating both with a central office and with the handset unit, the method comprising the steps of:

generating a service request signal for establishing communications with one of the plurality of base units;

detecting a service request response signal received from each one of the plurality of base units within a predetermined time period, each service request response signal containing a unique signal code associated with the base unit providing the service request response signal;

comparing a predetermined signal code stored in the handset unit with the unique signal code received from each base unit responding to the service request signal; and establishing communications with one of the plurality of base units, the establishing step initiating communications between the handset unit and the first one of the plurality of base units providing in the predetermined time period a unique signal code that compares favorably with the predetermined signal code stored in the handset unit and, in the absence of the handset unit receiving a favorably compared unique signal code in the predetermined time period, the establishing step initiating communications between the handset unit and the first one of the plurality of base units providing a non-favorably compared signal code within the predetermined time period.

12. A method of operating for a cordless telephone in a public telephone system, the cordless telephone including a plurality of base units connectable to a telephone line for communicating with a central office and at least one cordless handset unit for establishing communications with the base units, the method comprising the steps of:

generating in the handset unit a service request signal for establishing communications with one of the plurality of base units, the service request signal including a first predetermined signal code for initially identifying a base unit also containing this first predetermined signal code;

receiving in each base unit the service request signal containing the first predetermined signal code;

comparing in each base unit a second predetermined signal code stored therein with the first predetermined signal code received from the handset unit generating the service request signal;

generating in each base unit a service request response signal for transmitting to the handset unit, the base unit generating step causing a positive service acknowledgment signal to be transmitted to the handset unit when the first predetermined signal code received from the handset unit compares favorably with the second predetermined signal code stored in the base unit, and a negative service acknowledgment signal to be transmitted to the handset unit when the first predetermined signal code received from the handset unit compares unfavorably with the second predetermined signal code stored in the base unit; and responding selectively in the handset unit to the positive service acknowledgment signal received from the plurality of base units and the negative service acknowledgment signal received from the plurality of base units, the responding step storing all negative service acknowledgment signals received from the plurality of base units in a predetermined time period and, upon receiving a positive service acknowledgment signal in this predetermined time period from a base unit, establishing communications with the base unit providing the first positive service acknowledgment signal.

13. A method of operating for a cordless telephone in a pubic telephone system, the cordless telephone including a plurality of base units connectable to a telephone line for communicating with a central office and at least one cordless handset unit for establishing communications with the base units, the method comprising the steps of:

generating in the handset unit a service request signal for establishing communications with one of the plurality of base units, the service request signal including a first predetermined signal code for initially identifying a base unit also containing this first predetermined signal code;

receiving in each base unit the service request signal containing the first predetermined signal code;

comparing in each base unit a second predetermined signal code stored therein with the first predetermined signal code received from the handset unit generating the service request signal;

generating in each base unit a service request response signal for transmitting to the handset unit, the base unit generating step causing a positive service acknowledgment signal to be transmitted to the handset unit when the first predetermined signal code received from the handset unit compares favorably with the second predetermined signal code stored in the base unit, and a negative service acknowledgment signal to be transmitted to the handset unit when the first predetermined signal code received from the handset unit compares unfavorably with the second predetermined signal code stored in the base unit; and responding selectively in the handset unit to the positive service acknowledgment signal received from the plurality of base units and the negative service acknowledgment signal received from the plurality of base units, the responding step storing all negative service acknowledgment signals received from the plurality of base units in a predetermined time period and, in the absence of receiving a positive service acknowledgment signal from a base unit in this predetermined time period, establishing communications with the first base unit providing the negative service acknowledgment signal within the predetermined time period.

14. A cordless telephone arrangement for operation in a public telephone system, the arrangement including a plurality of base units connectable to a telephone line for communicating with a central office and at least one cordless handset unit for establishing communications with the base units, the arrangement comprising:

means in the handset unit for generating a service request signal for establishing communications with one of the plurality of base units, the service request signal including a first predetermined signal code for initially identifying a base unit containing a second predetermined signal code which compares favorably with said first predetermined signal code, said first predetermined signal code being associated with a specific service provider providing a base unit and telephone line for connecting the base unit to the central office;

means in each base unit for comparing the second predetermined signal code stored therein with the first predetermined signal code received from the handset unit generating the service request signal;

signal response generating means in each base unit responsive to the comparing means, the signal response generating means causing a positive service acknowledgment signal for establishing communications with the handset unit to be transmitted to the handset unit when the first predetermined signal code received from the handset unit compares favorably with the second predetermined signal code stored in the base unit, and a negative service acknowledgment signal for establishing communications with the handset unit to be transmitted to the handset unit when the first predetermined signal code received from the handset unit compares unfavorably with the second predetermined signal code stored in the base unit, said positive service acknowledgment signal being indicative of the handset unit and the base unit being associated with said specific service provider and said negative service acknowledgment signal being indicative of the base unit being associated with another service provider; and signal receiving means in the handset unit for selectively responding to the positive service acknowledgment signal received from the plurality of base units and the negative service acknowledgment signal received from the plurality of base units, the signal receiving means storing all negative service acknowledgment signals received from the plurality of base units in a predetermined time period and, establishing communications with the base unit providing the first positive service acknowledgment signal in the predetermined time period.

15. The cordless telephone arrangement as in claim 14 wherein the signal receiving means in the handset unit, in the absence of receiving said positive service acknowledgment signal from a base unit in the predetermined time period, establishes communications with the base unit providing the first negative service acknowledgment signal within the predetermined time period.

16. A method of operating for a cordless telephone in a public telephone system, the cordless telephone including a plurality of base units connectable to a telephone line for communicating with a central office and at least one cordless handset unit for establishing communications with the base units, the method comprising the steps of:

generating in the handset unit a service request signal for establishing communications with one of the plurality of base units, the service request signal including a first predetermined signal code for initially identifying a base unit containing a second predetermined signal code which compares favorably with said first predetermined signal code, said first predetermined signal code being associated with a specific service provider providing a base unit and telephone line for connecting the base unit to the central office;

receiving in each base unit the service request signal containing the first predetermined signal code;

comparing in each base unit the second predetermined signal code stored therein with the first predetermined signal code received from the handset unit generating the service request signal;

generating in each base unit a service request response signal for transmitting to the handset unit, the base unit generating step causing a positive service acknowledgment signal for establishing communications with the handset unit to be transmitted to the handset unit when the first predetermined signal code received from the handset unit compares favorably with the second predetermined signal code stored in the base unit, and a negative service acknowledgment signal to be transmitted to the handset unit for establishing communications with the handset unit when the first predetermined signal code received from the handset unit compares unfavorably with the second predetermined signal code stored in the base unit, said positive service acknowledgment signal being indicative of the handset unit and the base unit being associated with said specific service provider and said negative service acknowledgment signal being indicative of the base unit being associated with another service provider; and responding selectively in the handset unit to the positive service acknowledgment signal received from the plurality of base units and the negative service acknowledgment signal received from the plurality of base units, the responding step storing all negative service acknowledgement signals received from the plurality of base units in a predetermined time period and, establishing communications with the base unit providing the first positive service acknowledgment signal in the predetermined time period.

17. The method of operating for a cordless telephone as in claim 16 wherein the responding step further includes the steps of, in the absence of receiving a positive service acknowledgment signal from a base unit in the predetermined time period, establishing communications with the base unit providing the first negative service acknowledgment signal within the predetermined time period.

* * * * *